(12) United States Patent
Kouda (10) Patent No.: US 7,853,692 B2
(45) Date of Patent: Dec. 14, 2010

(54) SERVER, CLIENT APPARATUS, PROGRAM AND DOWNLOAD METHOD

(75) Inventor: Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 12/139,608

(22) Filed: Jun. 16, 2008

(65) Prior Publication Data

US 2008/0313261 A1 Dec. 18, 2008

(51) Int. Cl.
*G06F 15/16* (2006.01)

(52) U.S. Cl. .................. 709/225; 709/206; 709/217; 709/232; 709/223; 709/229; 709/248; 709/213; 709/215; 709/219; 709/218; 709/227; 709/228; 711/141; 711/124; 711/147; 711/100; 711/130; 711/154; 711/113

(58) Field of Classification Search .................. 709/206, 709/220–225, 217, 218
See application file for complete search history.

(56) References Cited

U.S. PATENT DOCUMENTS

| | | | |
|---|---|---|---|
| 7,188,161 B1* | 3/2007 | O'Neil et al. | 709/220 |
| 2005/0076082 A1* | 4/2005 | Le Pennec et al. | 709/206 |
| 2005/0246393 A1* | 11/2005 | Coates et al. | 707/200 |
| 2007/0089110 A1* | 4/2007 | Li | 717/178 |

* cited by examiner

*Primary Examiner*—Jude J Jean Gilles
(74) *Attorney, Agent, or Firm*—Frommer Lawrence & Haug LLP; William S. Frommer; Ellen Marcie Emas (57) ABSTRACT

A server connectable to a client apparatus over a network is disclosed. The server includes: means for generating a file containing an address of a download server that can distribute a download file to the client apparatus over the network and a first parameter that temporally regulates access from the client apparatus to the download server; and means for distributing the file to the client apparatus in response to a request from the client apparatus.

13 Claims, 10 Drawing Sheets

| MODEL ID AND UPDATE NUMBER | FILE DISTRIBUTION PARAMETER | DL CONTENT | DL VALID PERIOD FROM | DL VALID PERIOD TO | DL DISTRIBUTION PARAMETER | DL DESTINATION URL |
|---|---|---|---|---|---|---|
| PONY_DVR1001 | 0.5 DAY | UPDATE FILE VER. 1 | 4/1/2006 12:00 | 3/31/2007 23:59 | 7 DAYS | http://www.pony.co.jp/dvr1001/...1 |
| | | UPDATE FILE VER. 2 | 4/1/2007 12:00 | 6/30/2007 23:59 | 5 DAYS | http://www.pony.co.jp/dvr1001/...2 |
| 0002 | | IMPORTANT ANNOUNCEMENT 1 | 10/1/2011 0:00 | 12/31/2099 23:59 | 1 DAY | http://www.pony.co.jp/dvr1001/...3 |
| | | NEW PRODUCT ANNOUNCEMENT 2 | 7/1/2007 13:00 | 12/31/2099 23:59 | 1 DAY | http://www.pony.co.jp/dvr1001/...4 |

FIG. 4

| MODEL ID AND UPDATE NUMBER | FILE DISTRIBUTION PARAMETER | DL CONTENT | DL VALID PERIOD FROM | DL VALID PERIOD TO | DL DISTRIBUTION PARAMETER | DL DESTINATION URL |
|---|---|---|---|---|---|---|
| PONY_TV1001 | 2 DAYS | UPDATE FILE VER. 1 | 4/1/2006 12:00 | 3/31/2007 23:59 | 7 DAYS | http://www.pony.co.jp/tv1001/...1 |
| 0010 | | UPDATE FILE VER. 2 | 4/1/2007 12:00 | 6/30/2007 23:59 | 5 DAYS | http://www.pony.co.jp/tv1001/...2 |
| | | IMPORTANT ANNOUNCEMENT 1 | 10/1/2011 0:00 | 12/31/2099 23:59 | 1 DAY | http://www.pony.co.jp/tv1001/...3 |
| | | NEW PRODUCT ANNOUNCEMENT 2 | 7/1/2007 13:00 | 12/31/2099 23:59 | 1 DAY | http://www.pony.co.jp/tv1001/...4 |

SERVER, CLIENT APPARATUS, PROGRAM AND DOWNLOAD METHOD

CROSS REFERENCES TO RELATED APPLICATIONS

The present invention contains subject matter related to Japanese Patent Application JP 2007-160383 filed in the Japanese Patent Office on Jun. 18, 2007, the entire contents of which being incorporated herein by reference.

BACKGROUND OF THE INVENTION

1. Field of the Invention

The present invention relates to a server, a client apparatus, a program and a download method, which distribute or download a file such as moving images over a network.

2. Description of the Related Art

Heretofore, in the case in which a client apparatus acquires a file from a server, the client apparatus makes access to the server having the file stored therein as the client apparatus is triggered by some event (for example, a user manipulation, or an application using a timer function). However, since it is difficult for a service provider to control the events on the client side to be a trigger, there is a problem that files may not be acquired at the point at which a large number of client apparatuses make access to a server for concentration of access and the access exceeds the capacity of the server or a network. Particularly, this problem tends to occur proportionately with increases in the file size and the number of client apparatuses.

In order to avoid this problem, many service providers (server administrators) allocate various resources (servers and network resources) in consideration of traffic peaks. However, when resources are allocated all the time to manage traffic peaks, it means that excess resources are carried in the periods other than peak periods, which leads to increases in system construction initial costs/service costs. In addition, from the viewpoint of service providers (server administrators), since the occurrence of access triggered by a user manipulation is unpredictable and uncontrollable, the service providers (server administrators) are forced to manage systems so that services can be provided all the time.

JP-A-2006-135811 (Patent Reference 1) discloses a distributed system in which servers including a management server are provided other than a server providing moving images (see claim 1 of the Reference).

SUMMARY OF THE INVENTION

However, even the technique disclosed in Patent Reference 1, the result is that resources have to be allocated all the time to manage traffic peaks, which may not solve the essential problem.

It is desirable to provide a server, a client apparatus, a program and a download method, which can distribute the concentration of access to a download server from client apparatuses to smooth traffic peaks.

A server according to an embodiment of the invention is a server connectable to a client apparatus over a network, including: a means for generating a file containing an address of a download server that can distribute a download file to the client apparatus over the network and a first parameter that temporally regulates access from the client apparatus to the download server; and a means for distributing the file to the client apparatus in response to a request from the client apparatus.

In the embodiment of the invention, since the timing of making access to a download server from a client apparatus can be set to every client apparatus by control from a server, the concentration of access to the download server from client apparatuses can be distributed to smooth traffic peaks.

Preferably, the first parameter may be a parameter that regulates a waiting time for access from the client apparatus to the download server. Preferably, the first parameter may be a parameter that regulates a period for access from the client apparatus to the download server. Alternatively, the first parameter may be preferably a parameter that regulates a period for access from the client apparatus to the download server and a waiting time within the period.

The file to be generated may contain a second parameter that temporally regulates a request to distribute the file from the client apparatus. Therefore, the concentration of access to a server can be avoided as well.

Here, the embodiment of the invention may further include a means for optimizing the first parameter depending on a load condition of the download server, and a means for optimizing the second parameter depending on a load condition of the download server. Here, for example, the means for optimizing the first parameter depending on a load condition of the download server may be a means for varying the first parameter depending on a load condition of the download server. For example, the means for optimizing the second parameter depending on a load condition of the download server may be a means for varying the second parameter depending on a load condition of the download server.

In the case in which access is concentrated unexpectedly because of user manipulations or misestimation, a system administrator has to optimize the parameters for files stored in a server based on the access conditions, and it is likely to increase service loads (service man-hours). Then, such a scheme is provided in a server, for example, in which parameters specified in a file are automatically determined and calculated from the state of using resources on the server side, for instance, and the values of the parameters are optimized. Accordingly, more highly accurate load distribution can be implemented by lower man-hours.

A client apparatus according to an embodiment of the invention is a client apparatus including: a means for making a request to a server to distribute a file containing an address of a download server that can distribute a download file and a first parameter that temporally regulates access to the download server over a network; and a means for making access to the download server at a time instant based on the first parameter contained in the file distributed from the server in response to the request. Accordingly, the concentration of access to a download server from client apparatuses can be distributed to smooth traffic peaks.

The means for requesting distribution may make a request to the server to distribute the file at a time instant based on a second parameter that is contained in the file and temporally regulates a request to the server to distribute the file. Accordingly, the concentration of access to a server can be avoided as well.

A program according to an embodiment of the invention is a program which allows a client apparatus to perform a process including the steps of: making a request to a server to distribute a file containing an address of a download server that can distribute a download file and a first parameter that temporally regulates access to the download server over a network; and making access to the download server at a time instant based on the first parameter contained in the file distributed from the server in response to the request. Accordingly, the concentration of access to a download server from client apparatuses can be distributed to smooth traffic peaks.

A download method according to an embodiment of the invention is a download method including the steps of: allowing a client apparatus to make a request to a server to distribute a file containing an address of a download server that can distribute a download file and a first parameter that temporally regulates access to the download server over a network; allowing the server to distribute the file to the client apparatus in response to the request from the client apparatus; and allowing the client apparatus to make access to the download server at a time instant based on the first parameter contained in the file distributed from the server in response to the request. Accordingly, the concentration of access to a download server from client apparatuses can be distributed to smooth traffic peaks.

As described above, according to the embodiment of the invention, the concentration of access to a download server from client apparatuses can be distributed to smooth traffic peaks.

DESCRIPTION OF THE PREFERRED EMBODIMENTS

Hereinafter, embodiments of the invention will be described with reference to the drawings.

Figure 1:
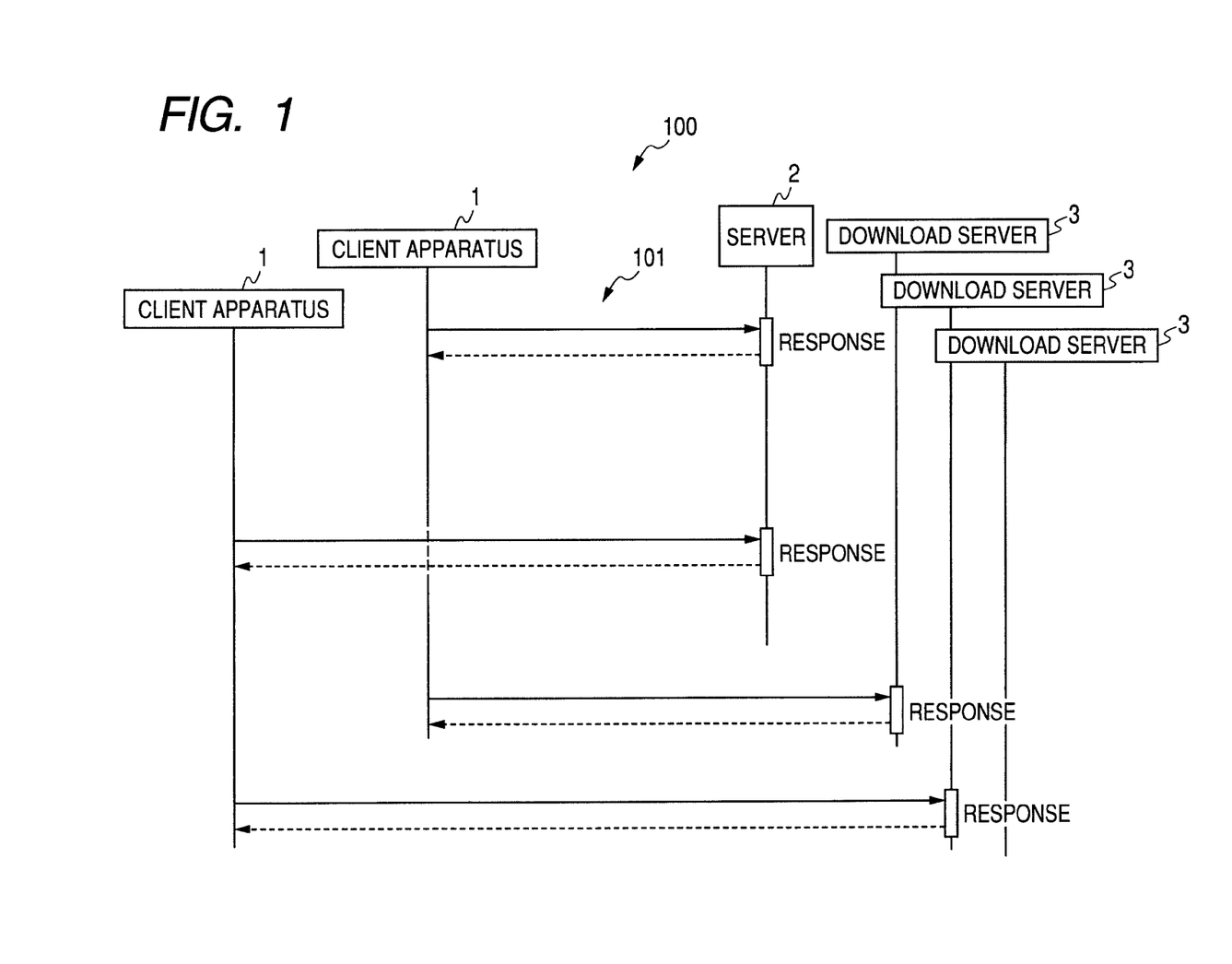
FIG. 1 shows a conceptual diagram depicting a client/server system according to an embodiment of the invention.

FIG. 1 shows a conceptual diagram depicting a client/server system according to an embodiment of the invention.

As shown in FIG. 1, a client/server system 100 is configured in which a plurality of client apparatuses 1 such as digital video recorders and TV sets is connected to a server 2 and a plurality of download servers 3 over a network 101 such as the Internet. For example, the client apparatus 1 and the server 2 communicate with each other through polling communications or P2P (Peer To Peer), and a file in which control information for access to the download server 3 is described (hereinafter, this file is referred to as a "file B") is distributed from the server 2 to the client apparatus 2. In addition, a file downloaded from the download server 3 to the client apparatus 2 (a moving image file such as a movie and an update file to the client apparatus 1) is a file A.

Figure 2:
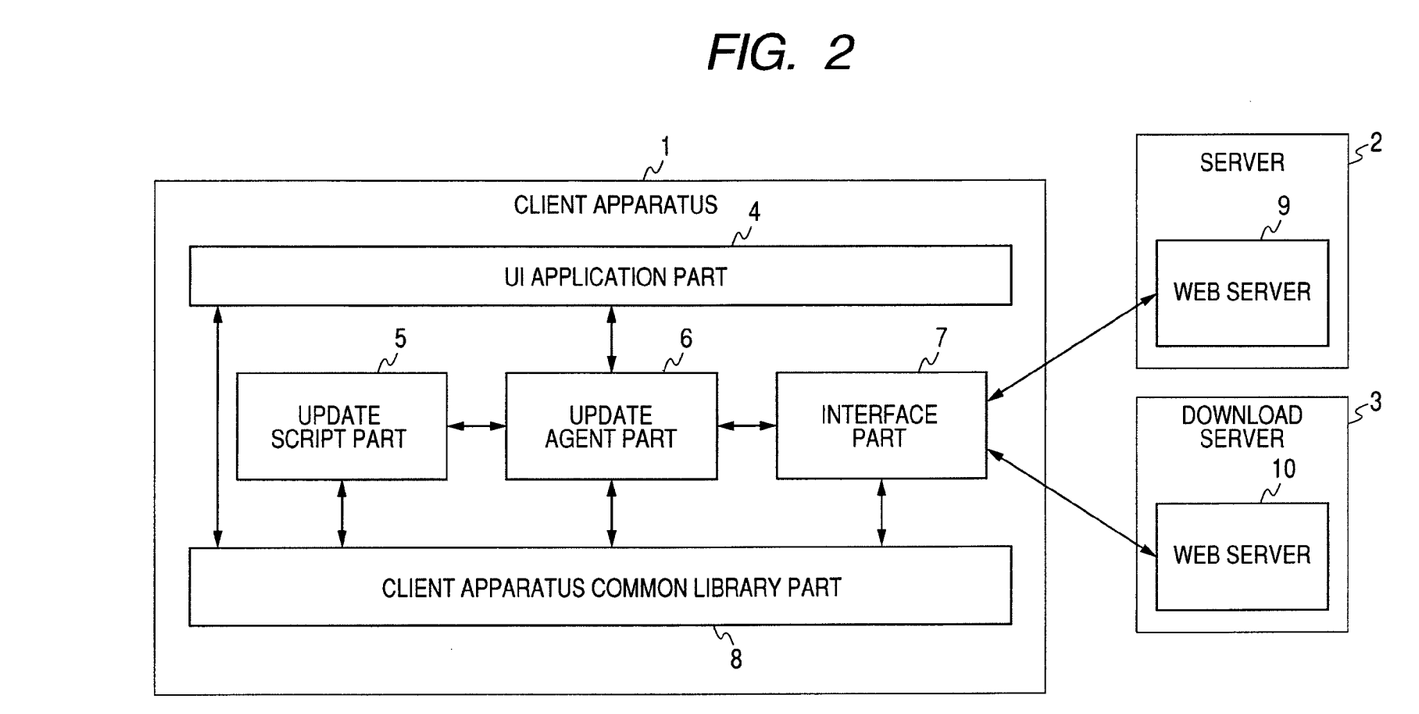
FIG. 2 shows a block diagram depicting the configurations of a client apparatus, a server and a download server.

FIG. 2 shows a block diagram depicting the configurations of the client apparatus 1, the server 2 and the download server 3.

As shown in FIG. 2, the client apparatus 1 has a UI (User Interface) application part 4, an update script part 5, an update agent part 6, an interface part 7 and a client apparatus common library part 8.

To the update agent part 6, the UI application part 4 makes a request to acquire a file B, an instruction to start a process of a request to acquire a file A and an instruction to finish the process of the request to acquire the file A as it is triggered by a user input manipulation of information from an input part, not shown.

For example, in the case in which the file A downloaded from the download server 3 by the client apparatus 1 is an update file, the update script part 5 updates software of the client apparatus 1 based on the update file.

The update agent part 6 accepts requests and processed results relating to downloads and updates from the UI application part 4, the interface part 7, and the update script part 5, and controls the update process for the client apparatus 1.

For example, more specific update control is as follows:

(1) The update agent part 6 and the interface part 7 are started when the power source of the client apparatus 1 is tuned on.

(2) A manual update instruction is accepted from the UI application part 4 to inform the interface part 7.

(3) The interface part 7 communicates with the server 2 and the download server 3 to download an update file.

(4) The result of the update file download process is received from the interface part 7, and an instruction is made to start an upgrade mode for the client apparatus 1.

(5) The result of the update process is received from the update script part 5 to inform the UI application part 4, the client apparatus common library part 8 of the result.

(6) In the case in which it is necessary to stop downloading because of the constraints of the client apparatus 1, the interface part 7 is informed of that.

The interface part 7 communicates with the server 2 and with the download server 3, and downloads a necessary update file (file A) from the download server 3.

More specifically, the interface part 7 communicates with the server 2 at regular time intervals by background processing for confirming the existence of update files. In the case in which it is found that the latest update file exists, the interface part 7 informs the update agent part 6 of that. In the case in which the latest update file exists and a certain condition is satisfied, the interface part 7 makes access to the download server 3 to acquire the update file (file A) and downloads it.

The client apparatus common library part 8 provides a common function in the client apparatus 1.

More specifically, the client apparatus common library part 8 answers the current time instant managed in the client apparatus 1 and the current software version of the client apparatus 1, and further has a network diagnostic function.

In addition, the update script part 5 and the update agent part 6 performs the processes above in the case in which the file A is an update file. However, for example, in the case in which a file A to be downloaded from the download server 3 by the client apparatus 1 is a large sized file such as moving images, the update agent part 6 and the update script part 5 become a content manager and a moving image title management function.

The server 2 has a Web server 9 that communicates with the client apparatus 1 over the network 101. In addition, for example, the URI of the external interface of the server 2 is embedded in advance when the client apparatus 1 is shipped.

The download server 3 also has a Web server 10 that communicates with the client apparatus 1 over the network 101. In addition, for example, the URI of the download server 3 is given as a "download destination URL" to the client apparatus 1 from the server 2.

Figure 3:
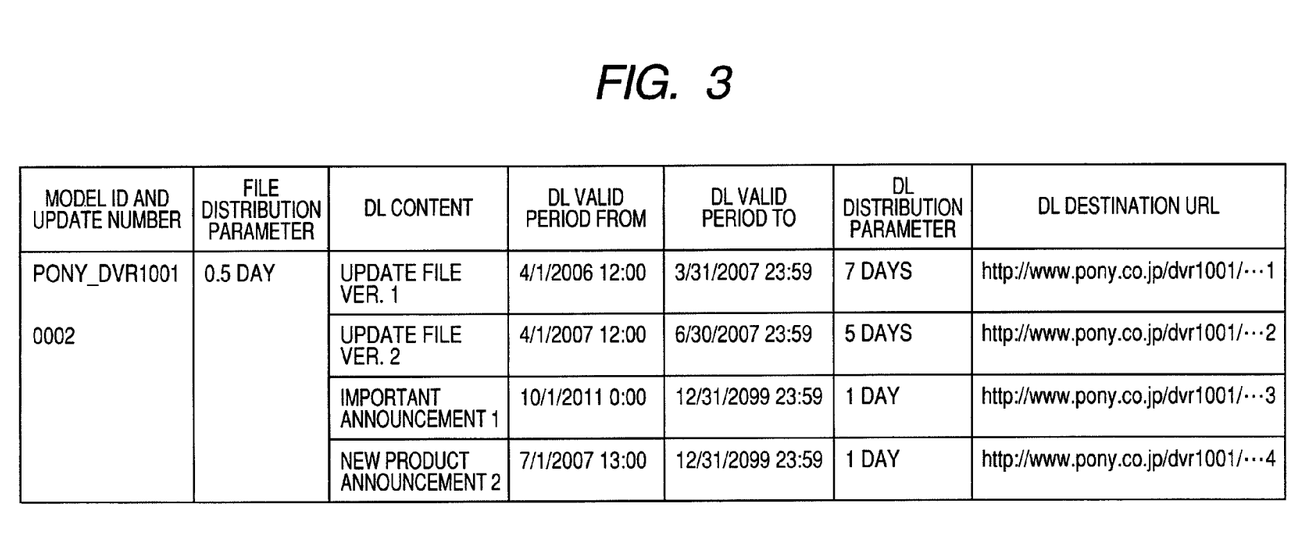
FIG. 3 shows a diagram depicting an exemplary format of a file sent to a client apparatus (digital video recorder) by the server.
Figure 4:
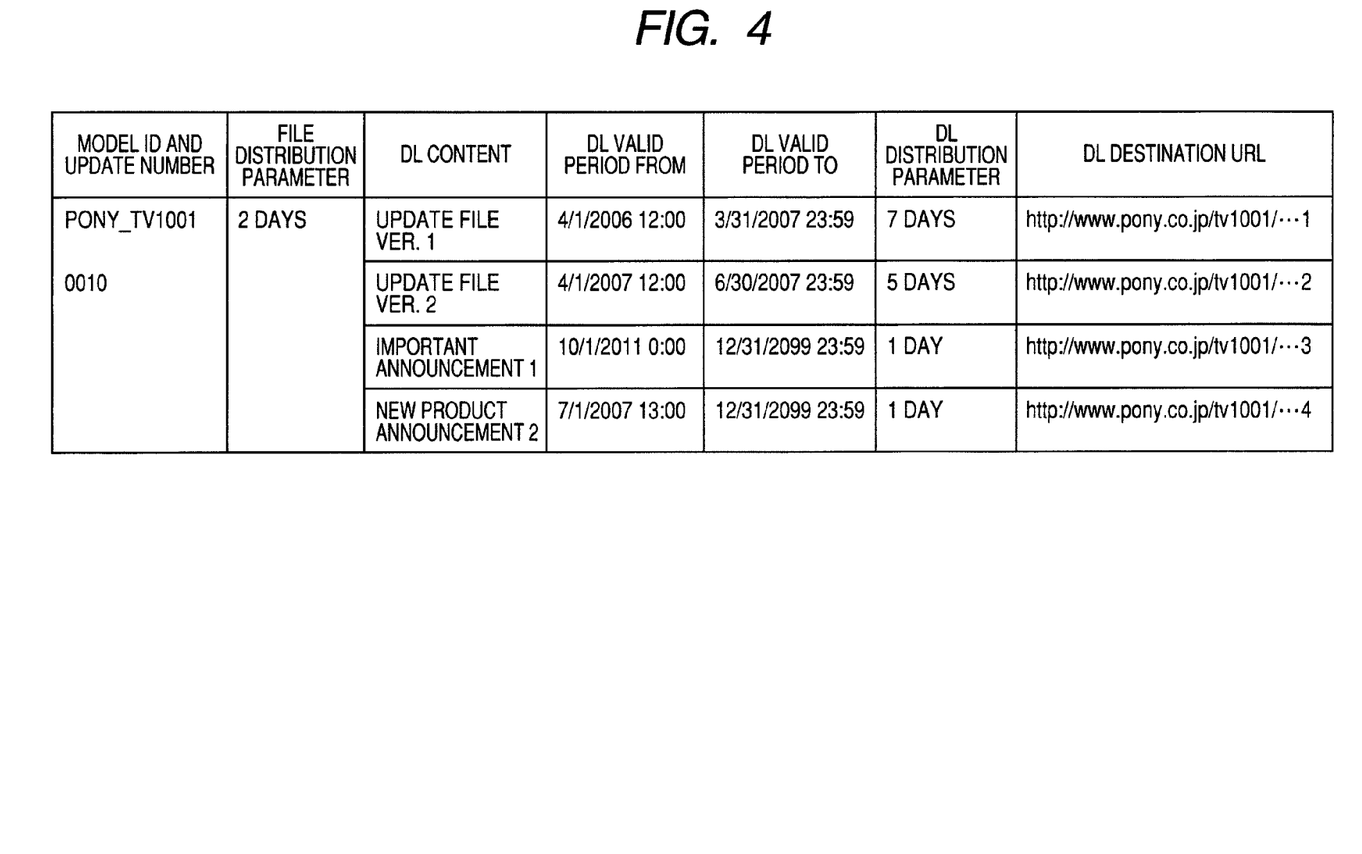
FIG. 4 shows a diagram depicting an exemplary format of a file sent to a client apparatus (TV set) by the server.

FIGS. 3 and 4 show a diagram depicting an exemplary file B sent to the client apparatus 1 by the server 2. In addition, the file shown in FIG. 3 is a file in the case in which the client apparatus 1 is a digital video recorder (DVR), and the file shown in FIG. 4 is a file in the case in which the client apparatus 1 is a television set (TV set).

As shown in FIGS. 3 and 4, the file B has items of information, including "a model ID and update number", "a file distribution parameter", "a download content (DL content)", "a download valid period start date and time (DL valid period From)", "a download valid period end date and time (DL valid period To)", "a download distribution parameter (DL distribution parameter)" and "a download destination URL (DL destination URL)".

"The model ID" is a unique ID to the client apparatus 1, which is information such as "PONY_digital video recorder 1001". "The update number" is information indicating the number of updates of the file B, for example, which is "0001" when not updated. The update number is incremented by '1' when one of the following items is changed, the download valid period start date and time, the download valid period end date and time and the download distribution parameter shown in FIG. 3.

"The file distribution parameter" is a parameter that distributes dates and times for every client apparatus 1 on which the client apparatus 1 automatically makes access to the download server 3. For example, "0.5 day" means that the client apparatus 1 automatically makes access to the download server 3 at a predetermined time interval based on a random number generated in 0 to 12 hours (12 h×60 min.×60 sec.), for instance.

"The download content" is information about the title of a content to be downloaded.

"The download valid period start date and time" is information about the date and time to start a period in which the client apparatus 1 is permitted to download a file A from the download server 3.

"The download valid period end date and time" is information about the date and time to end a period in which the client apparatus 1 is permitted to download a file A from the download server 3.

The client apparatus 1 is permitted to download a file A during the period from the download valid period start date and time to the download valid period end date and time.

"The download distribution parameter" is a parameter that changes information about the date and time to start the period in which the client apparatus 1 is permitted to download a file A from the download server 3 and alters forced waiting time. For example, the parameter is "7 days", "5 days" and "1 day". For instance, in the case of "7 days", the client apparatus 1 is not permitted to download a file A from the download server 3 until seven days, the forced waiting time, have elapsed.

"The download destination URL" is information about the URL of the download server 3 providing the file A.

Figure 5:
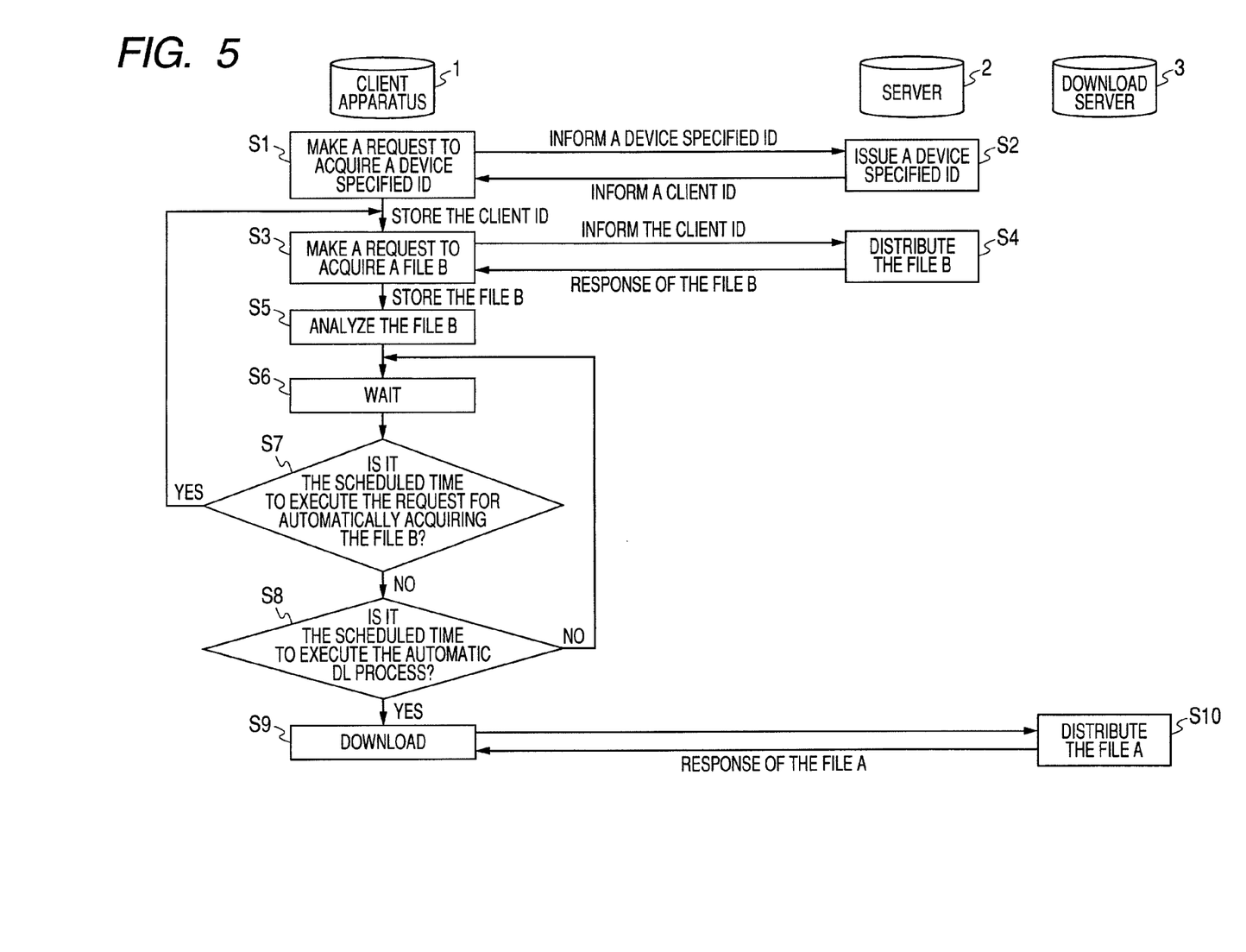
FIG. 5 shows a flow chart depicting the operation of an automatic download process.

Next, the operation of an automatic process when the client apparatus 1 downloads the file A from the download server 3 will be described.

FIG. 5 shows a flow chart depicting the operation of this automatic process.

After purchase, the client apparatus 1 makes a request to the server 2 to acquire a device specified ID (client ID) on the first setup (S1).

More specifically, the client apparatus 1 informs the server 2 of a model ID unique to every model recorded on the client apparatus 1 when shipped.

Based on the model ID, the server 2 determines whether the model corresponding to the model ID is the model for services. If it is the model for services, the server 2 issues a client ID, and informs the client apparatus 1 of the issued client ID (S2).

The client apparatus 1 stores the client ID informed by the server 2 in the client apparatus common library part 8. At the time of starting the client apparatus 1 next time and later, the process steps after S3 are performed.

For example, the case will be described in which the client apparatus 1 downloads a file B from the server 2.

First, the client apparatus 1 makes a request to the server 2 to acquire a file B (S3).

More specifically, the client apparatus 1 informs the server 2 of the client ID for acquiring the file B.

Subsequently, based on the client ID, the server 2 extracts information corresponding to the client ID, for example, information about the file B shown in FIG. 3 from data stored in the server 2 to generate the file B, and distributes the file B to the client apparatus 1 (S4).

The client apparatus 1 stores the file B in the client apparatus common library part 8.

Subsequently, the client apparatus 1 analyzes the file B (S5). For example, based on "the file distribution parameter" described in the file B shown in FIG. 3, the client apparatus 1 calculates "the next scheduled time to execute the request to automatically acquire the file B".

For example, the client apparatus 1 acquires the value "0.5 day" that is the file distribution parameter shown in FIG. 3 as an example, generates a random number in the time from 0 to 0.5 (12 h×60 min.×60 sec.), and adds the generated random number to the current time instant for "the next scheduled time to execute the request to automatically acquire the file B". Thus, the client apparatus 1 will not have overlapping access timing with the other client apparatuses 1.

In addition, based on "the download distribution parameter" shown in FIG. 3, the client apparatus 1 calculates "the next scheduled time to execute the automatic download process". For example, when "an update file Ver. 1" is downloaded in "the download contents" shown in FIG. 3, based on the value "7 days" that is "the download distribution parameter" corresponding thereto, the client apparatus 1 generates a random number in the time from 0 to 7 days×24 h×60 min.× 60 sec., forms the generated random number into units of "seconds", and adds the value to "4/1/2006 12:00" that is "the download valid period start date and time" for "the next scheduled time to execute the automatic download process". In addition, in calculating "the next scheduled time to execute the automatic download process", such a scheme may be possible in which a random number is generated in the time between "the download valid period start date and time" and "the download valid period end date and time", for example, and based on the generated random number, "the next scheduled time to execute the automatic download process" is calculated.

Subsequently, the client apparatus 1 determines whether the current time instant is "the scheduled time to execute the request to automatically acquire the file B" (S7). If it is "the scheduled time to execute the request to automatically acquire the file B", the client apparatus 1 returns to Step 3, and performs making a request to acquire the file B already described.

If it is not "the scheduled time to execute the request to automatically acquire the file B", the client apparatus 1 determines whether it is "the scheduled time to execute the automatic download process" (S8). If it is neither "the scheduled time to execute the request to automatically acquire the file B" nor "the scheduled time to execute the automatic download process", the client apparatus 1 waits (S6).

If it is "the scheduled time to execute the automatic download process" in S8, the client apparatus 1 downloads the file A from the download server 3 (S9). In other words, the client apparatus 1 makes a request to the download server 3 to download the file A, and the download server 3 distributes the file A to the client apparatus 1 (S10)

Here, for example, in the case in which the file B is updated during the waiting time (S6), based on new information about the file B, "the scheduled time to execute the request to automatically acquire the file B" and "the scheduled time to execute the automatic download process" are again recalculated (updated).

Figure 6:
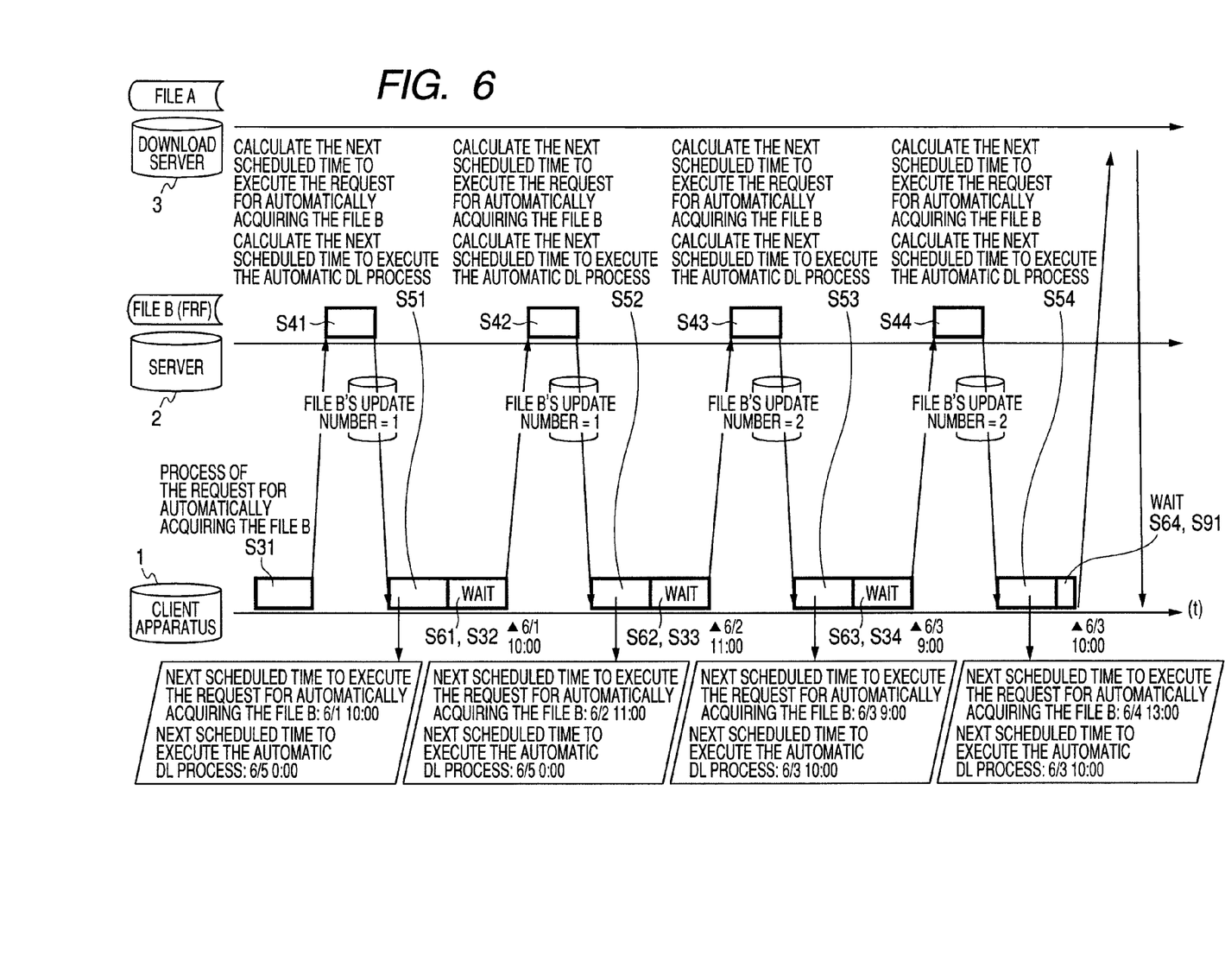
FIG. 6 shows a time chart depicting recalculation (update) of the scheduled time to execute a request to automatically acquire a file and the scheduled time to execute the automatic download process.

FIG. 6 shows a time chart depicting the recalculation (update) of "the scheduled time to execute the request to automatically acquire the file B" and "the scheduled time to execute the automatic download process".

As shown in FIG. 6, the client apparatus 1 executes "the process of the request to automatically acquire the file B" (S31).

The server 2 informs the client apparatus 1 of a file B whose "update number" shown in FIG. 3 is '1' (S41).

Based on the file B, the client apparatus 1 calculates "the next scheduled time to execute the request to automatically acquire the file B" to be "6/1/2007 10:00", and "the scheduled time to execute the automatic download process" to be "6/5/2007 0:00" (S51).

As the result, the client apparatus 1 waits until the current time instant reaches "6/1/2007 10:00" (S61). If the client apparatus 1 determines that it reaches this time instant, the client apparatus 1 executes "the process of the request to automatically acquire the file B" (S32). Since "the scheduled time to execute the automatic download process" is "6/5/2007 0:00" but "the scheduled time to execute the request to automatically acquire the file B" is "6/1/2007 10:00", the download process is not executed.

In the case in which "the update number" is not changed, the server 2 again informs the client apparatus 1 of a file B whose update number" is '1' (S42)

Based on the file B, the client apparatus 1 calculates "the next scheduled time to execute the request to automatically acquire the file B" to be "Jun. 6/2/2007 11:00", and "the scheduled time to execute the automatic download process" to be "6/5/2007 0:00" (S52). In the case in which "the update number" is not changed, only "the scheduled time to execute the request to automatically acquire the file B" is again calculated, and "the scheduled time to execute the automatic download process" is not again calculated.

As the result, the client apparatus 1 waits until the current time instant reaches "6/2/2007 11:00" (S62), and if the client apparatus 1 determines that it reaches this time instant, the client apparatus 1 executes "the process of the request to automatically acquire the file B" (S33). Since "the scheduled time to execute the automatic download process" is "6/5/2007 0:00" but "the scheduled time to execute the request to automatically acquire the file B" is "6/2/2007 11:00", the download process is not executed.

In the case in which the update number is changed, the server 2 informs the client apparatus 1 of a file B whose update number is '2' (S43).

Based on the file B whose update number is '2', the client apparatus 1 calculates "the next scheduled time to execute the request to automatically acquire the file B" to be "6/3/2007 9:00", and "the scheduled time to execute the automatic download process" to be "6/3/2007 10:00" (S53). In the case in which the update number is changed, "the scheduled time to execute the request to automatically acquire the file B" and "the scheduled time to execute the automatic download process" are again calculated.

As the result, the client apparatus 1 waits until the current time instant reaches "6/3/2007 9:00" (S63), and if the client apparatus 1 determines that it reaches this time instant, the client apparatus 1 automatically makes a request to acquire the file B (S34). Since "the scheduled time to execute the automatic download process" is "6/3/2007 10:00" but the scheduled time to execute the request to automatically acquire the file B" is "6/3/2007 9:00", the download process is not executed.

In the case in which the update number is not changed, the server 2 informs the client apparatus 1 of a file B whose update number is '2' (S44).

Based on the file B whose update number is '2', the client apparatus 1 calculates "the next scheduled time to execute the request to automatically acquire the file B" to be "6/4/2007 13:00", and "the scheduled time to execute the automatic download process" to be "6/3/2007 10:00" (S54). In the case in which the update number is not changed, only "the scheduled time to execute the request to automatically acquire the file B" is again calculated, and "the scheduled time to execute the automatic download process" is not again calculated.

As the result, the client apparatus 1 waits until the current time instant reaches "6/3/2007 10:00" (S64), and if the client apparatus 1 determines that it reaches this time instant, the client apparatus 1 automatically downloads the file B (S91).

Figure 7:
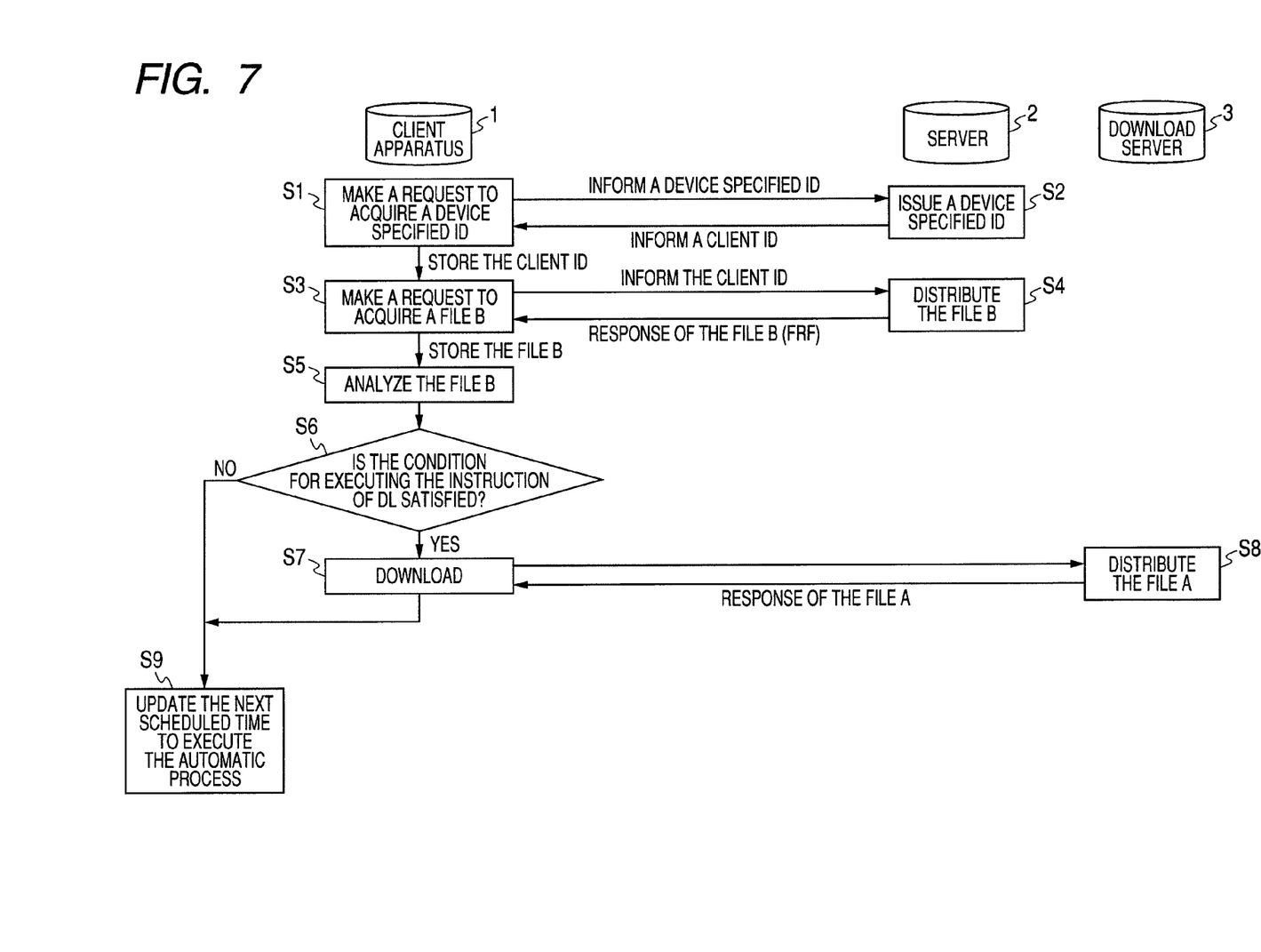
FIG. 7 shows a flowchart depicting the operation of manual processing in downloading a file.

FIG. 7 shows a flowchart depicting the operation of manual processing in downloading a file. In addition, Steps S1 and S2 are the same as those described above, omitting the descriptions.

Here, FIGS. 8 to 11 show an exemplary screen displayed on the client apparatus 1 in manually downloading the file A.

Figure 8:
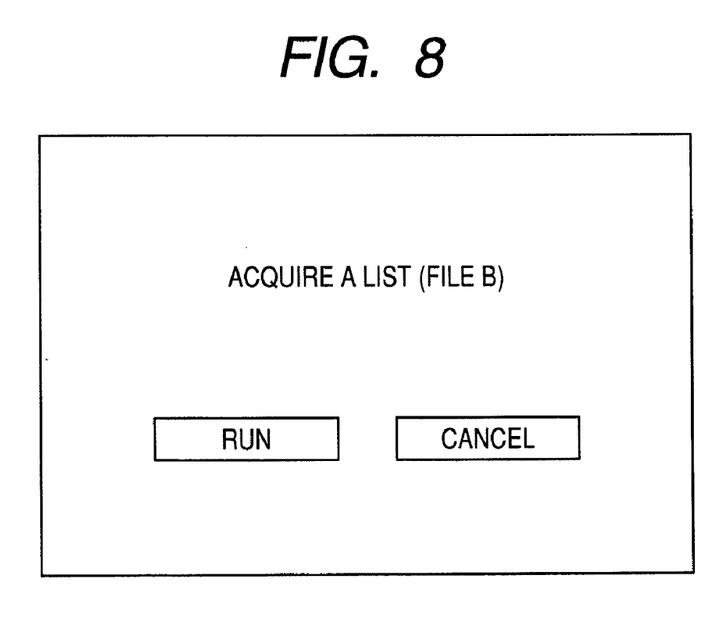
FIG. 8 shows an exemplary screen displayed on the client apparatus in manually downloading a file (screen 1)
Figure 9:
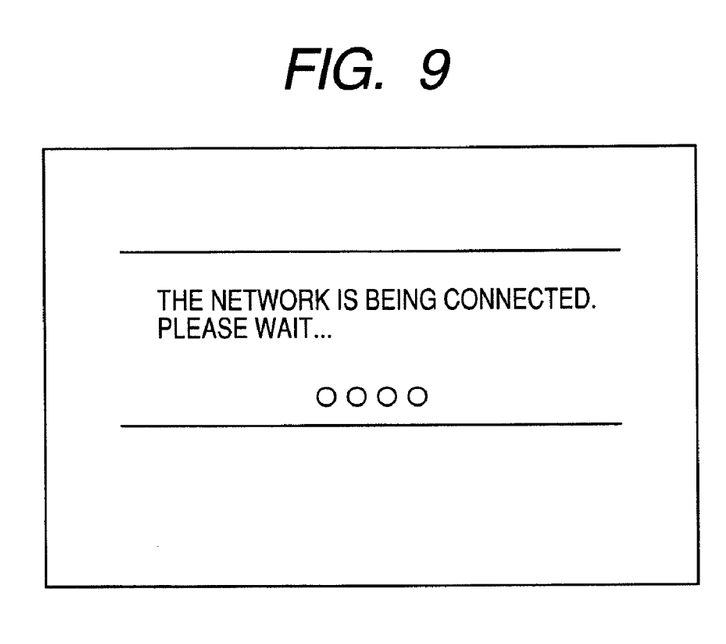
FIG. 9 shows an exemplary screen displayed on the client apparatus in manually downloading a file (screen 2)

First, as shown in FIG. 8, a screen is displayed to determine whether to acquire a file B. The client apparatus 1 determines whether a user clicks a run button of the screen shown in FIG. 8 or clicks a cancel button. If the user clicks the run button, the client apparatus 1 makes a request to the server 2 to acquire the file B (S3). For example, the client apparatus 1 informs the server 2 of the client ID, and acquires the file B. If the user clicks the cancel button, the client apparatus 1 closes the screen shown in FIG. 8.

Based on the client ID, the server 2 extracts information corresponding to the client ID in data stored in the server 2, generates the file B shown in FIG. 3, for example, and distributes the file B to the client apparatus 1 (S4).

The client apparatus 1 stores the file B.

Subsequently, the client apparatus 1 analyzes the file B (S5). In other words, the client apparatus 1 analyzes control information when making access to the download server 3. More specifically, as described above, based on the file distribution parameter shown in FIG. 3, the client apparatus 1 calculates the next scheduled time to execute the request to automatically acquire the file B.

Subsequently, the client apparatus 1 determines whether the download is executable (S6). In other words, in the case of manual processing, the client apparatus 1 ignores the download distribution parameter shown in FIG. 3. For example, in the case in which the client apparatus 1 downloads "an update file Ver. 1" in "the download contents" shown in FIG. 3, the client apparatus 1 determines whether the current time instant (the scheduled time to execute the request to automatically acquire the file B) is between "4/1/2007 12:00" that is the download valid period start date and time and "3/31/2007 23:59" that is the download valid period end date and time. For example, during this analysis, the client apparatus 1 displays a screen shown in FIG. 9.

Figure 10:
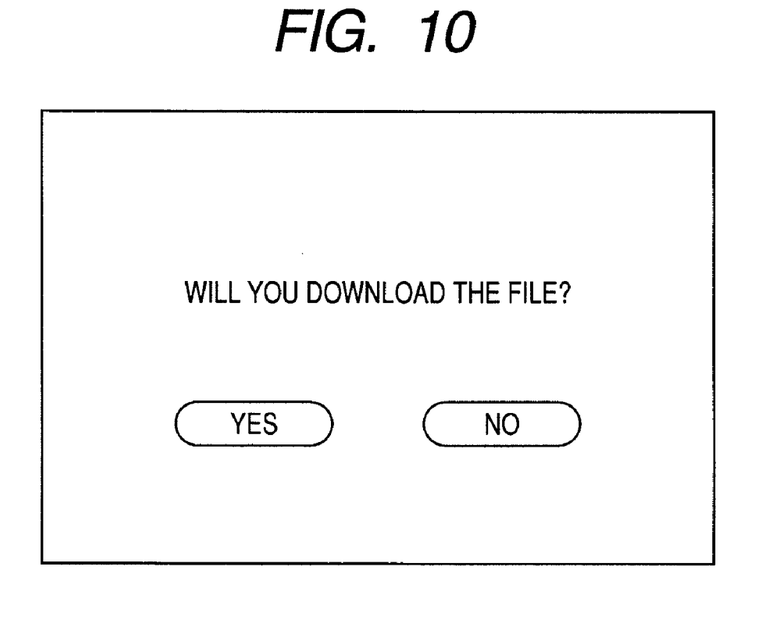
FIG. 10 shows an exemplary screen displayed on the client apparatus in manually downloading a file (screen 3)

If the current time instant is between them, the client apparatus 1 displays a screen shown in FIG. 10, whereas if the current time instant is not between them, the client apparatus 1 displays a screen, not shown, showing that a file for download is not found (download is not permitted).

Figure 11:
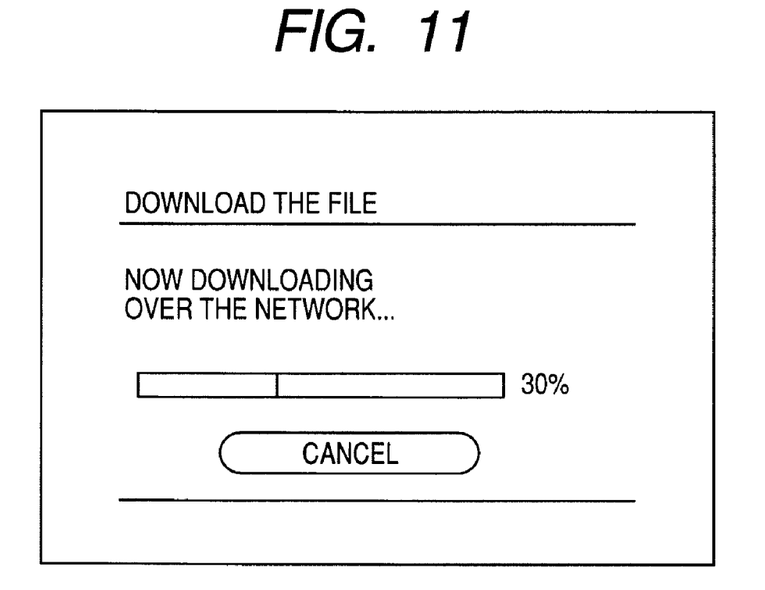
FIG. 11 shows an exemplary screen displayed on the client apparatus in manually downloading a file (screen 4)

The client apparatus 1 determines whether the user clicks a "YES" button for updating software or clicks a "NO" button on the screen shown in FIG. 10. If the user clicks "YES", a screen shown in FIG. 11 is displayed, showing that the file is now being downloaded, whereas the user clicks "NO", the screen shown in FIG. 10 is deleted.

In S6, if the client apparatus 1 determines that it is difficult to download the file, for example, the client apparatus 1 makes "the request to acquire the file B" as described above, and calculates (updates) "the next scheduled time to execute the automatic download process".

As discussed above, according to the embodiment, when the client apparatus 1 makes a request to the server 2 to acquire a file A, the client apparatus is informed of a file B including information about access control to the download server 3 in which the file A is placed, based on information about "the download valid period start date and time", "the download valid period end date and time" and "the download distribution parameter" contained in the file B, the time instant to permit the client apparatus 1 to download the file A from the download server 3 can be controlled (distributed). Therefore, the traffic peaks can be suppressed in every download server 3.

Accordingly, since it is unnecessary to allocate resources such as servers to manage extreme traffic peaks, system construction initial costs and service costs can be curtailed.

In addition, the information about "the download distribution parameter" contained in the file B is set to every download destination URL, whereby access distribution and integration are feasible as the performance of the individual servers is used at the maximum.

Moreover, "the download valid period start date and time" and "the download valid period end date and time" contained in the file B are informed to the client apparatus 1, and then the client apparatus 1 is not permitted to make access to the download server 3 other than this period, whereby the maintenance of the download server 3 can be performed for convenience on the service provider side.

In addition, in the case in which acquiring the file B is failed, or the acquired file B does not contain "the file distribution parameter" or "the download distribution parameter", "the next scheduled time to execute the request to automatically acquire the file B" may be calculated based on the default value embedded in the client apparatus 1 in advance when shipped, or by computing the default value based on partial information about the client apparatus 1 (a Mac address, a substrate ID, an IP address and so on).

In addition, "the download valid period start date and time" and "the download valid period end date and time" contained in the file B are informed to the client apparatus 1, and as soon as it reaches a given time instant in this period, the client apparatus 1 is permitted to automatically make access to the server to download a file, whereby a user can download files anytime, day and night, and weekdays and holidays. From a broad view, a larger number of the client apparatuses 1 are permitted to download files more quickly than the client apparatus 1 is triggered by a user manipulation to download a file.

Figure 12:
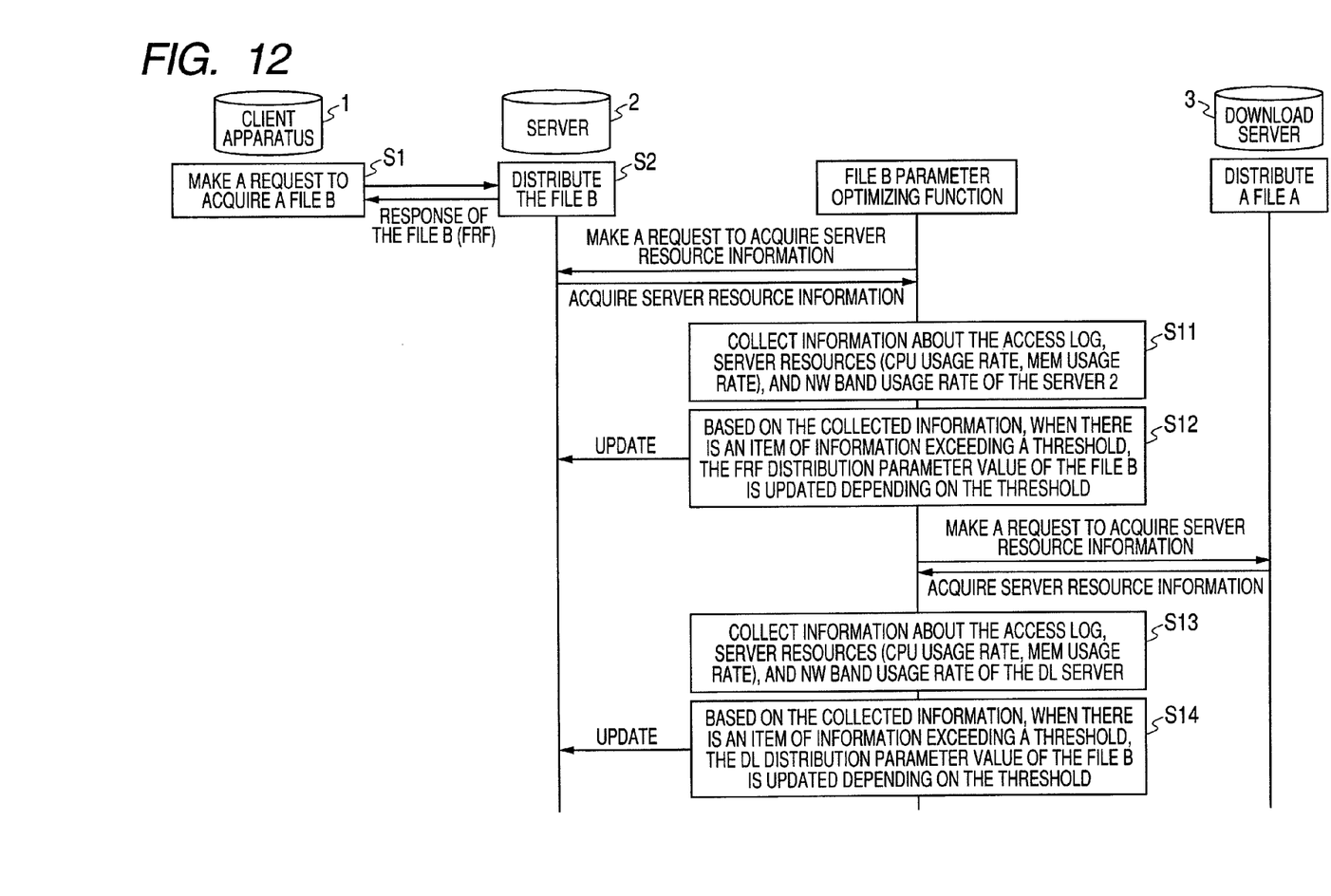
FIG. 12 shows a timing chart illustrative of the operation of a client/server system according to another embodiment of the invention.

Next, another embodiment of the invention will be described.

FIG. 12 shows a timing chart illustrative of the operation of a client/server system according to another embodiment of the invention.

As shown in FIG. 12, a server 2 according to the embodiment has an optimizing function that optimizes the descriptions of the file B depending on the access conditions to the server 2 or to the download server 3 by the client apparatus 1. In addition, of cause, the optimizing function may be provided in other apparatuses other than the server 2.

The optimizing function of the server 2 makes a request to the server 2 itself to acquire server resource information, and acquires server resource information. For example, the term server resource information includes information such as the access log, server resources (a CPU usage rate and a memory usage rate), and network band usage rate of the server 2. Thus, the optimizing function of the server 2 acquires information such as the access log, server resources (the CPU usage rate and the memory usage rate), and network band usage rate of the server 2 (S11).

Based on these items of information, the optimizing function of the server 2 updates "the value of the file distribution parameter" (S12). Examples thereof are shown below.

1. When the CPU usage rate exceeds 80%, the value of the file distribution parameter is set to 1.25 times.

2. When the CPU usage rate exceeds 90%, the value of the file distribution parameter is set to 1.5 times.

3. When the network band usage rate exceeds 75%, the value of the file distribution parameter is set to 2.0 times.

Subsequently, the optimizing function of the server 2 makes a request to the download server 3 to acquire server resource information, and then acquires server resource information. For example, the term server resource information includes information such as the access log, server resources (a CPU usage rate and a memory usage rate), and network band usage rate of the download server 3. Thus, the optimizing function of the server 2 acquires information such as the access log, server resources (the CPU usage rate and the memory usage rate), and network band usage rate of the download server 3 (S13).

Based on these items of information, the optimizing function of the server 2 updates "the value of the download distribution parameter" (S14). Examples thereof are shown below.

1. When the CPU usage rate exceeds 80%, the value of the file distribution parameter is set to 1.25 times.

2. When the CPU usage rate exceeds 90%, the value of the file distribution parameter is set to 1.5 times.

3. When the network band usage rate exceeds 75%, the value of the file distribution parameter is set to 2.0 times.

As discussed above, according to the embodiment, since such a function is provided that can automatically optimize the value of the file distribution parameter of the file B based on the resource information of the server 2 and the download server 3, the distribution of loads to the download server 3 and other servers can be effectively implemented.

In addition, the embodiment of the invention is not restricted to the embodiments described above, which can be variously modified within the technical concepts according to the embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A server connectable to a client apparatus over a network, comprising:
    generating a control information file containing (a) an address of a download server that can distribute a download file to the client apparatus over the network and (b) a first parameter that temporally regulates time of access by the client apparatus to the download server; and
    distributing the control information file to the client apparatus in response to a periodic request from the client apparatus to download the control information file, wherein the request from the client apparatus is generated based upon the first parameter.

2. The server according to claim 1,
    wherein the first parameter is a parameter that regulates a waiting time for access from the client apparatus to the download server.

3. The server according to claim 1,
    wherein the first parameter is a parameter that regulates a period for access from the client apparatus to the download server.

4. The server according to claim 1,
    wherein the first parameter is a parameter that regulates a period for access from the client apparatus to the download server and a waiting time within the period.

5. The server according to claim 1, further comprising:
    optimizing the first parameter depending on a load condition of the download server.

6. The server according to claim 1, wherein the control information file to be generated contains a second parameter that temporally regulates a time the client apparatus can request the server to distribute the control information file to the client apparatus.

7. The server according to claim 6, further comprising:
    optimizing the second parameter depending on a load condition of the download server.

8. A client apparatus comprising:
    making a periodic distribution request to a server to distribute a control information file containing (a) an address of a download server that can distribute a download file and (b) a first parameter that temporally regulates times of access by the client apparatus to the download server over a network; and
    making an access request to the download server for access at a time instant based on the first parameter contained in the control information file distributed from the server in response to the periodic distribution request.

9. The client apparatus according to claim 8,
    wherein making the automatic distribution request makes the periodic distribution request to the server to distribute the control information file at a time instant based on a second parameter that is contained in the control information file and temporally regulates a time to request the server to distribute the control information file.

10. A client apparatus having a program stored thereon to perform a process comprising the steps of:
    making a periodic distribution request to a server to distribute a control information file containing (a) an address of a download server that can distribute a download file and (b) a first parameter that temporally regulates time of access by the client apparatus to the download server over a network; and
    making an access request to the download server for access by the client apparatus at a time instant based on the first parameter contained in the control information file distributed from the server in response to the periodic distribution request.

11. A download method comprising the steps of:
    allowing a client apparatus to make a periodic distribution request to a server to distribute a control information file containing (a) an address of a download server that can distribute a download file and (b) a first parameter that temporally regulates time of access by the client apparatus to the download server over a network;
    allowing the server to distribute the control information file to the client apparatus in response to the periodic distribution request from the client apparatus; and
    allowing the client apparatus to make an access request to the download server at a time instant based on the first parameter contained in the control information file distributed from the server in response to the periodic distribution request.

12. A server connectable to a client apparatus over a network, comprising:
    a unit configured to generate a control information file containing (a) an address of a download server that can distribute a download file to the client apparatus over the network and (b) a first parameter that temporally regulates time of access by the client apparatus to the download server; and
    a unit configured to make a request to distribute the control information file to the client apparatus in response to a periodic request from the client apparatus, wherein the request from the client apparatus is generated based upon the first parameter to download the control information file.

13. A client apparatus comprising:
    a unit configured to make a periodic distribution request to a server to distribute a control information file containing (a) an address of a download server that can distribute a download file and (b) a first parameter that temporally regulates time of access by the client apparatus to the download server over a network; and
    a unit configured to make an access request to the download server at a time instant based on the first parameter contained in the control information file distributed from the server in response to the periodic distribution request.

* * * * *

UNITED STATES PATENT AND TRADEMARK OFFICE
CERTIFICATE OF CORRECTION

PATENT NO. : 7,853,692 B2
APPLICATION NO. : 12/139608
DATED : December 14, 2010
INVENTOR(S) : Hirofumi Kouda It is certified that error appears in the above-identified patent and that said Letters Patent is hereby corrected as shown below:

Title page Add
Item
    --(30)    Foreign Application Priority Data     June 18, 2007    JP    P2007-160383--

Signed and Sealed this
Twenty-second Day of February, 2011

David J. Kappos
*Director of the United States Patent and Trademark Office*